Nov. 21, 1933. A. I. MARCUM 1,935,746
TANDEM AXLE STEERING AND TORQUE RESISTING ARRANGEMENT
Original Filed April 25, 1930  3 Sheets-Sheet 1
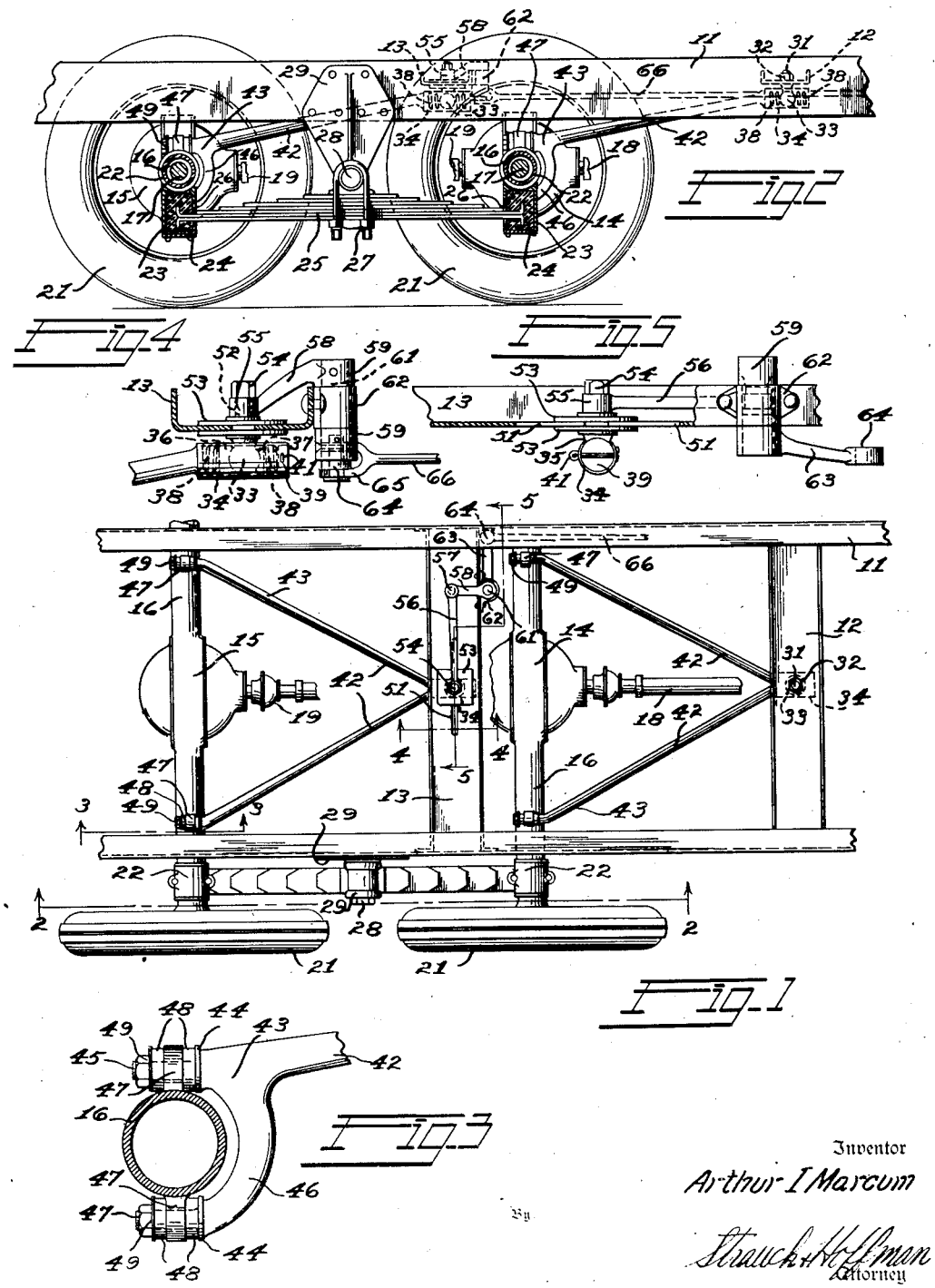
Inventor
Arthur I Marcum Nov. 21, 1933.  A. I. MARCUM  1,935,746
TANDEM AXLE STEERING AND TORQUE RESISTING ARRANGEMENT
Original Filed April 25, 1930   3 Sheets-Sheet 2
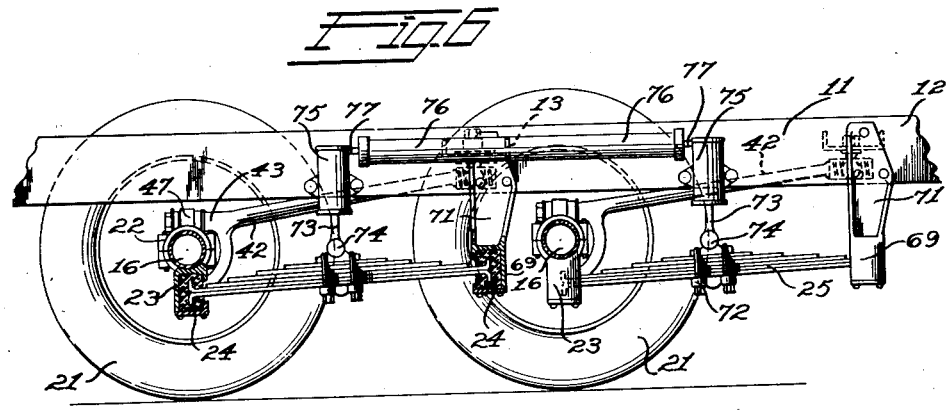
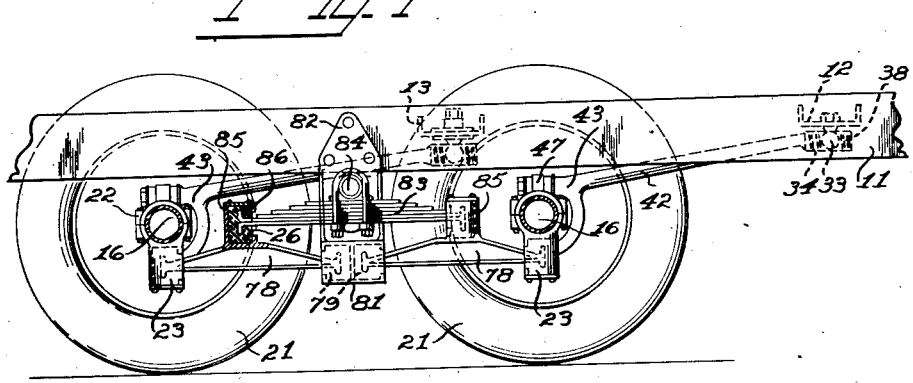
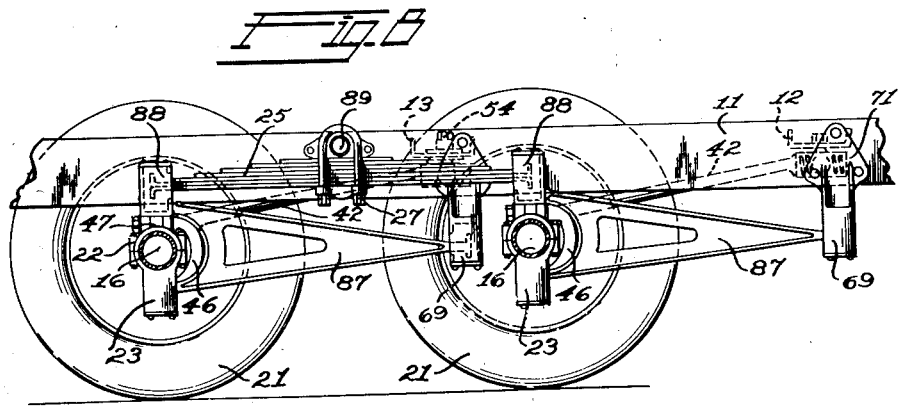
Inventor
Arthur I Marcum
By Strauch & Hoffman
Attorney Nov. 21, 1933.  A. I. MARCUM  1,935,746
TANDEM AXLE STEERING AND TORQUE RESISTING ARRANGEMENT
Original Filed April 25, 1930  3 Sheets-Sheet 3
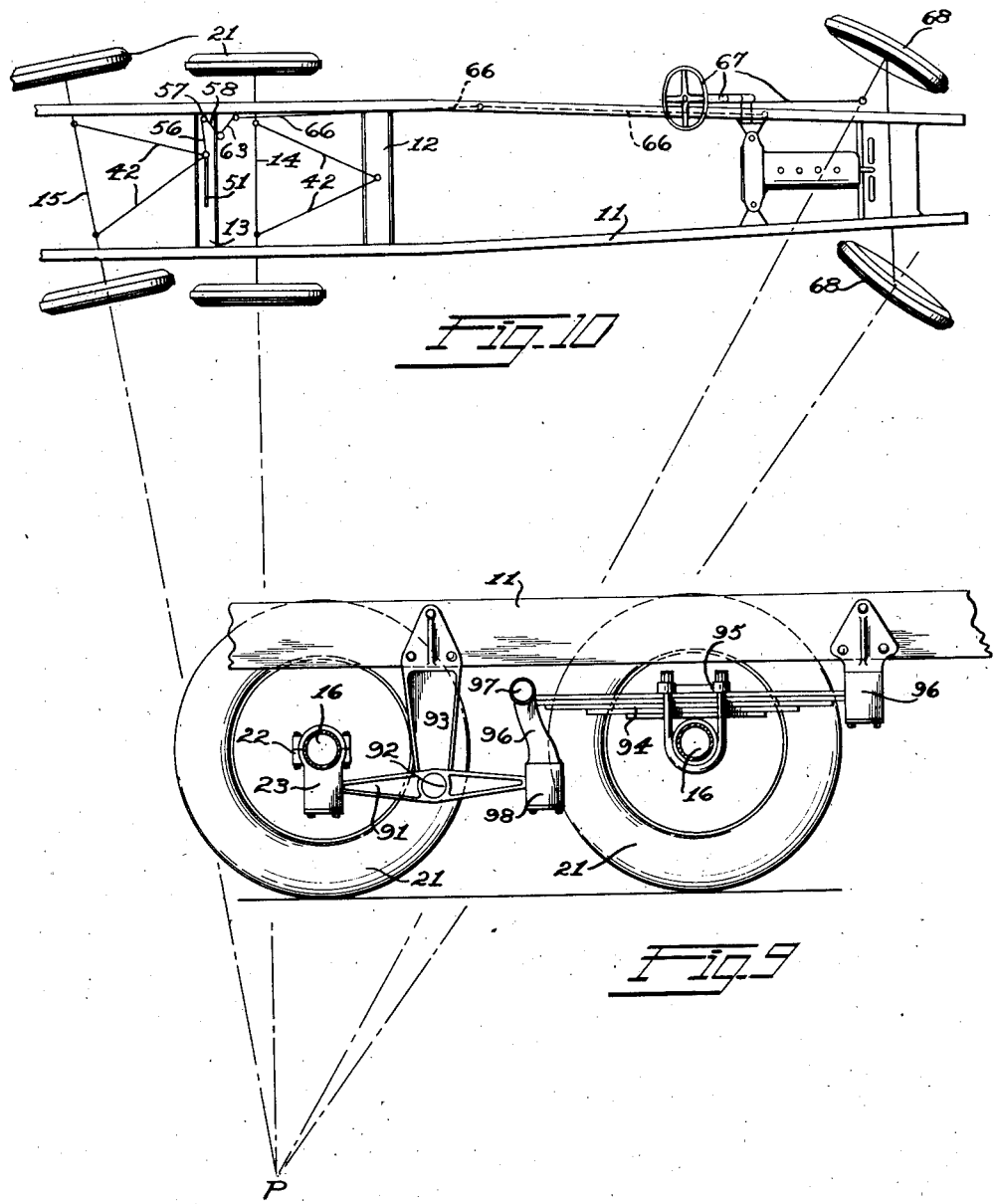
Inventor
Arthur I Marcum
By
Strauch & Hoffman
Attorney Patented Nov. 21, 1933

1,935,746

UNITED STATES PATENT OFFICE 1,935,746

TANDEM AXLE STEERING AND TORQUE RESISTING ARRANGEMENT

Arthur I. Marcum, Oakland, Calif., assignor, by mesne assignments, to Automotive Engineering Corporation, a corporation of Delaware Application April 25, 1930, Serial No. 447,384
Renewed April 6, 1933

7 Claims. (Cl. 280—91)

This invention relates to multi-wheel suspension systems, particularly those involving steering mechanism to eliminate drag, and involving means for resisting torque reactions set up in response to driving and braking forces.

In six and eight wheel vehicles which have a pair or more of tandem axles supported on non-dirigible wheels, there is a marked tendency for the non-dirigible wheels to drag, as well as roll, over the road surface whenever the vehicle deviates from a straight course, as in rounding curves and making turns. Dragging of these wheels causes the tires to wear rapidly and unevenly and also subjects the parts of the chassis to severe and damaging stresses.

It has been proposed to reduce drag by overlapping the tires of the tandem axles at each side of the frame. This, however, does not wholly eliminate drag, and it renders it very difficult to change those tires which are thus disposed between the frame and the outer set of tires. Suspensions have been designed of such flexibility and arrangement that the tandem axles are free to move laterally, automatically and independently of the front dirigible wheels, as the vehicle changes its course. Such suspensions have been generally unsatisfactory because of undesirable flexibility and uncontrolled steering. It has also been proposed to shift the ends of the separate tandem axles relative to one another through manually controlled mechanism to eliminate drag, but such mechanisms have been too complex and cumbersome and have been employed in connection with suspensions unsuitable for the purpose specified.

Accordingly it is a primary object of this invention to provide simple and properly controlled steering means for association with tandem axles that are supported by non-dirigible wheels. In this connection it is a further object to design suspension systems for use with said steering means to render the latter most useful and effective during operation.

A further object of the invention lies in the provision of means for automatically steering one axle of a tandem pair in response to the usual steering movement of a dirigible set of wheels at the opposite end of the vehicle, this automatic means preferably being so designed that when the vehicle is turning the axes of rotation of all wheels of the vehicle intersect, when extended, at a common point in the vertical plane of the non-steered tandem axle.

It is another major object of the present invention to provide a single mechanism having the dual functions of resisting torque reactions and of serving as a drag eliminator.

A still further object of this invention is to provide a torque-resisting device, rigidly connected to an axle and flexibly connected to the chassis frame centrally thereof.

Another object is to design novel and useful suspension systems for use in multi-wheel vehicles.

Further objects will become apparent from a study of the following detailed description when taken in connection with the accompanying drawings, in which:

Figure 1 is a partial top plan view of the end of a multi-wheeler chassis embodying one form of my invention.

Figure 2 represents a sectional side view as seen when looking toward the vertical plane indicated by line 2—2 of Figure 1.

Figure 3 is an enlarged detail view of the torque arm and axle connection, taken in section as indicated by line 3—3, Fig. 1.

Figure 4 is another enlarged detail view, showing the steering connections as seen when looking upon the vertical longitudinal plane designated by line 4—4, Figure 1.

Figure 5 is an enlarged section view of the steeling connections, taken substantially along the vertical transverse plane represented by line 5—5 in Figure 1, with certain elements illustrated in elevation to secure clarity of detail.

Figure 6 shows, in a view similar to Figure 2, a modified form of the invention embodying a suspension of the fluid equalizing type.

Figure 7 illustrates, in a manner corresponding to that of Figures 2 and 6, still another embodiment of my invention, involving a different type of equalizing suspension.

Figure 8 constitutes a further modification, in which another form of suspension is employed.

Figure 9 represents a still further modification, in which still another type of suspension system is utilized.

Figure 10 is a diagrammatic plan view of a complete vehicle chassis, showing a preferred manner of automatically steering one of the rear axles, of the tandem axle systems illustrated in Figures 1-9 inc., in response to manipulation of the forward dirigible wheels, the wheel movements being greatly exaggerated for purposes of illustration.

With reference now to the drawings, in which like characters are employed to designate corresponding parts and with particular reference to Figures 1 to 5, numeral 11 indicates the main chassis frame of the vehicle, having adjacent one end thereof a pair of transverse channel beams 12 and 13. Beneath the frame and spaced to the rear of the respective beams 12 and 13 is a pair of tandem axle assemblies 14 and 15. Either of these axles may be dead or driven but, as illustrated, they are live axles comprising housings 16 receiving axle shafts 17 that are driven by propelling mechanism 18, 19. The latter mechanism is shown only partially and in no great detail, since it is of conventional design and forms no part of this invention.

The housings 16 are supported by wheels 21. Between each wheel and the frame each housing 16 has journaled thereon a hanger 22 which carries a depending shackle box 23 that is substantially filled with a resilient and deformable material 24, such as high grade rubber. At each side of the chassis the ends of a leaf spring 25 project freely through slots 26 into the interior of the shackle boxes 23 and are completely embedded in the rubber blocks. Intermediate its ends the leaf spring is mounted, by means of a U-bolt assembly 27 upon a trunnion shaft 28 the latter element serving to support the load through a bracket 29 that is secured to the chassis frame.

Midway between its ends the cross beam 12 carries a pin 31, secured in place by a nut 32 and having a ball shaped extremity 33 disposed below said beam. A normally horizontal cylinder 34 is likewise disposed beneath said beam and is slotted as at 35 so that it may receive the ball 33 and permit the latter to move longitudinally of the cylinder. (See also Figures 4 and 5, in which the ball and cylinder details are exactly the same as those where the sections for said figures are taken.) The ball 33 has a universal seat between a pair of short plungers 36 and 37 that are adapted to reciprocate within the bore of the cylinder, subject to the resistance of a pair of compression springs 38. One of these springs reacts between plunger 36 and the rear end of the cylinder, and the other reacts between plunger 37 and a closure cap 39 which is pinned, as at 41, into the front end of the cylinder.

The cylinder 34 forms an integral joining element for the merging arms 42 of a V-shaped member 43 that may serve as a radius rod, torque-resisting rod, or a steering device. The arms 42 are of such length and their rear ends so spaced apart that said ends project into proximity to the ends of the forward rear axle. The end of each arm (see Figure 3), terminates in a shoulder 44 and a spindle 45, and has an offset curved yoke 46 which passes around the front of axle housing 16 and terminates in a shoulder 44 and spindle 45. The spindles 45 project freely through a pair of diametrically opposed integral lugs 47 formed on the axle housing. Each lug is sandwiched between a pair of thick rubber washers 48 and is maintained in tight connection with its spindle 45 by a nut and washer assembly 49.

A duplicate of the V-shaped assembly, just described, is connected to the rearmost axle and projects forwardly with its cylinder 34 disposed centrally of and below the cross-beam 13. The beam has a through-slot 51 forming a guideway longitudinally thereof for a pin 52 that carries the ball 33. A pair of sliding plates 53 surround reduced portions of the pin 52 on opposite sides of the beam. The pin has a bolt-head 54 for screwing it into the ball 33 and for maintaining the eye 55 of a link 56 in position upon the pin. The said link 56 extends laterally to a point where, as indicated at 57, its opposite end is pivotally connected to one arm 58 of a specially formed bell crank 59. The crank 59 has a vertical arm-interconnecting pivot 61 supported in a bracket 62 that is riveted upon the side of channel beam 13. The other arm 63 of the bell crank extends laterally from pivot 61 to be pivotally received, as at 64, in the forked end 65 of an operating rod 66.

The operation of the above described apparatus is as follows:

The axles are free to swing up and down about the spring trunnions 28, this movement being permitted or, rather, not positively restricted by the deformable blocks 24, the swinging hangers 22, the coil springs 38, and the universal balls 33. The ends of the axles are likewise free to tilt in vertical planes with respect to each other, this movement being permitted by the resilience of springs 25, the deformability of rubber blocks 24, the slight play in the interconnections between the axles and arms 42, and the universal joints afforded by the balls 33.

The arms 42 function as radius rods and, by virtue of the manner in which they are clamped upon the axles to prevent rotation of the latter, they also serve as torque rods. The rear axle may be steered by shifting the frame interconnection of its V-assembly along the slot 51 in the beam 13, thus causing the axle to be shifted from its normal position with respect to the longitudinal center line of the chassis. This is done in a predetermined manner by reciprocating the operating a rod 66 either forwardly or rearwardly a certain distance, in this way pivoting the bell crank 59 about its vertical axis with a resultant actuation of the link 56, the pin 52, and the ball 33.

The steering preferably is accomplished, in the manner illustrated in Figure 10, by hooking up the rod 66 with the steering arm of a conventional steering mechanism 67 that is utilized to control the front dirigible wheels 68 of the vehicle. In this way the rear axle may be steered automatically in response to the steering actuation of the usual dirigible wheels. The linkages preferably are so designed and proportioned that the dirigible front wheels and the steered rear wheels will track along curves the radial centers of which coincide within the vertical plane of the axes of rotation of the non-steered wheels. This is diagrammatically illustrated in Figure 10, wherein the extended axes of wheel rotation intersect in a common point P. In this manner all dragging of the rear wheels is substantially eliminated, the ground-engaging surfaces of the non-steered wheels serving as pivotal points for the entire vehicle while it is turning. It should be understood, however, that the steering device of this invention may be utilized in other hook-ups and proportions, and that, though only the rearmost axle has been illustrated as shiftable, either the front rear axle or both rear axles may be steered in similar fashion.

In that form of the invention illustrated in Figure 6 the axles are not directly interconnected at each side by a spring beam but each has a spring beam 25 individual thereto, which individual beams are in turn interconnected through equalizing means and the chassis frame. The rear ends of springs 25 are supported in the depending shackle boxes 23 and the forward ends thereof are received in rubber blocks 24 contained in block housings 69, the latter being integrally supported by frame brackets 71. Each spring has a U-bolt assembly 72 intermediate its ends, to which assembly one end of a piston rod 73 is connected, as at 74, by either a horizontal pivot or a universal joint. The upper end of each rod 73 is connected in well known manner to a piston (not seen) that reciprocates within a vertical cylinder 75. Each cylinder is secured upon the frame, as shown, to support the load, and is connected to one end of a pulsation or retarding reservoir 76 by a short conduit 77. The reservoir and cylinders contain a liquid, or a compressed gas.

The apparatus of Figure 7 differs from that of Figure 6 in that the pneumatic equalizer of Figure 6 is displaced by a pivoted beam, and the axles are adapted to swing in oppositely directed, rather than parallel arcs. A rigid beam 78 is connected at its forward end to the front shackle box 23, and another beam 78 is connected at its rear end to the rear shackle box 23. The other ends of these beams project toward each other and are received in rubber blocks 79 within a twin block housing 81 that is carried by a frame-supported bracket 82. An equalizing spring 83 is pivoted upon a bracket-carried trunnion 84, with its ends projecting to points just above the intermediate portions of the rigid beams 78. Said intermediate portions are provided with upright housings 85 containing rubber blocks 86 for receiving the ends of the equalizing spring 83.

That form of the invention shown in Figure 8 includes a suspension embodying some of the principles of both of those in Figures 6 and 7. It comprises a pair of rigid beams 87, each supported at its forward end in a block housing 69 formed on a frame-carried bracket 71, and each forked at its rear end to be supported in the shackle box 23 and to support an integral block housing 88 just above its corresponding axle. An equalizing spring beam 25 is trunnioned upon the frame as at 89 to receive the load, and has its ends supported in the block housings 88 to distribute said load upon the axles.

In the apparatus of Figures 6, 7, and 8, just described, the torque and steering arms 42 function in substantially the same manner as in Figures 1-5. The axles are rendered more independent of each other, however, and steering is accomplished with greater ease and precision, due to the provision of equalizing devices for reducing the frame movement relative to the ground and due to the disposition of rubber blocks at all those points where the suspension beams, individual to the axles, are connected to other elements of the apparatus.

In Figure 9 there is illustrated still another type of suspension, this one being quite simple in design and particularly adapted for the steering of the front axle of the rear tandem pair. In this form the standard equalizing beam is eliminated, a rigid axle-supported beam 91 being designed to perform the load and shock equalizing functions. This beam 91 has its rear end received and supported in the shackle box 23 of the rear depending hanger 22, and is pivoted intermediate its ends upon a tunnion 92 upon a frame-carried bracket 93. The forward axle carries no depending hanger. Instead, it directly supports an overhanging spring beam 94, it being journaled in a U-bolt assembly 95 that is clamped upon the spring. The forward end of beam 94 is received in a frame-carried block housing 96, designed similar to housings 69 of Figure 6. The free ends of rigid beam 91 and spring beam 94 are interconnected by a special shackle comprising a rigid link 96, pivotally connected to the spring as at 97 and having an integral block housing 98 for receiving the front end of the rigid beam. It will be understood that the housing 98, and all other similar housings shown in elevation in Figure 9 and the other views, contain deformable and resilient rubber blocks 24 of the type seen in Figure 2.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What I claim and desire to secure by United States Letters Patent is:—

1. In a multi-wheel vehicle, a frame; a pair of closely spaced tandem axles disposed beneath one end of said frame; means for supporting each side of said frame upon said axles comprising flexible suspensions including load-supporting means universally connected to said axles by means yieldingly resisting endwise axle movement, whereby said axles may be forced to partake of a limited lateral movement with respect to said frame; means substantially rigid with respect to one of said tandem axles and projecting toward said frame; means adjustably connecting the free end of said substantially rigid means to said frame; and a device for shifting said adjustable means.

2. In the apparatus defined in claim 1, said resisting devices comprising devices swingingly journaled upon the ends of said axles and provided with deformable blocks for connection with their corresponding load supporting beams.

3. In a road vehicle, a frame; pairs of wheels supporting said frame; one of said pairs of wheels having an axle provided with a pair of rigid lugs substantially at the top and bottom thereof; an arm flexibly and shiftably connected at one end thereof to said frame centrally of the latter and forked at its other end to provide a pair of terminals for free projection through said lugs; and a fastening assembly, including resilient and deformable means, associated with said lugs and said terminals to provide a yielding interlock between the same.

4. In combination in a road vehicle, a frame comprising side channel members and a cross member; an axle mounted beneath the rear end of said frame adjacent said cross member; an arm extending from said axle at a fixed angle with respect to the axis thereof and projecting into the proximity of said cross member; a transversely shiftable device mounted on said cross member and universally connected to said arm; a bell crank pivoted upon one end of said cross member; a link interconnecting one arm of said crank and said shiftable device; and means for oscillating the other arm of said crank.

5. In the apparatus defined in claim 4, said actuating means comprising an elongated rod pivotally connected to said other arm and extending forwardly within the channel of one of said side frame members.

6. In a multi-wheel road vehicle, a chassis frame; a set of tandem axles one of which is supported by non-dirigible wheels at one end of said frame; a flexible suspension for mounting said frame upon said tandem axles; means connected to at least one of said tandem axles in such manner as to project therefrom at a fixed angle with respect to the axis thereof; and mechanism interconnecting said means and the front end of said vehicle for the purpose of steering said last mentioned tandem axle; said interconnecting mechanism comprising elongated substantially rigid rod of normally fixed length extending rearwardly along one side of said frame, and a device interconnecting the rod and a portion of said means to convert reciprocatory movement of said rod into transverse movement of said portion of said means.

7. In combination in a road vehicle, a frame; an axle disposed beneath said frame; a spring suspension mounting said frame upon said axle, said suspension being designed to yieldingly resist endwise movement of said axle laterally with respect to the frame; an arm projecting from said axle at a fixed angle relative to the axis of the latter, said arm having at its projecting end a laterally shiftable universal connection with the frame; steering means for shifting said connection; and said suspension having sufficient resistance to prevent said endwise axle movement except when said steering means is actuated.

ARTHUR I. MARCUM.